(12) United States Patent
Darr et al.

(10) Patent No.: US 11,938,876 B2
(45) Date of Patent: Mar. 26, 2024

(54) ELECTRICAL UNIT

(71) Applicant: Lear Corporation, Southfield, MI (US)

(72) Inventors: Christopher J. Darr, Livonia, MI (US); Peter Kowtun, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 419 days.

(21) Appl. No.: 17/401,648

(22) Filed: Aug. 13, 2021

(65) Prior Publication Data

US 2023/0047395 A1    Feb. 16, 2023

(51) Int. Cl.
| | | |
|---|---|---|
| *B60R 16/023* | (2006.01) | |
| *H01R 13/506* | (2006.01) | |
| *H01R 13/52* | (2006.01) | |
| *H02G 3/08* | (2006.01) | |

(52) U.S. Cl.
CPC ...... *B60R 16/0238* (2013.01); *B60R 16/0239* (2013.01); *H01R 13/52* (2013.01); *H02G 3/081* (2013.01); *H01R 13/506* (2013.01)

(58) Field of Classification Search
CPC .. H01R 13/502; H01R 13/506; H01R 13/516; H01R 13/518; H01R 13/5213; H01R 13/5216; H01R 13/5219; H01R 13/5221; B60R 16/0238; B60R 16/0239; H02G 3/081

See application file for complete search history.

(56) References Cited

U.S. PATENT DOCUMENTS

| | | | |
|---|---|---|---|
| 6,919,509 B2 * | 7/2005 | Oda | H05K 7/026 174/59 |
| 8,961,245 B2 | 2/2015 | Kowtun | |
| 9,124,081 B2 | 9/2015 | Kowtun et al. | |
| 9,265,164 B2 | 2/2016 | Darr et al. | |
| 9,462,702 B2 | 10/2016 | Darr et al. | |
| 10,283,917 B1 * | 5/2019 | Darr | B60R 16/0238 |

* cited by examiner

*Primary Examiner* — Oscar C Jimenez
*Assistant Examiner* — Paul D Baillargeon
(74) *Attorney, Agent, or Firm* — MacMillan, Sobanski & Todd, LLC

(57) ABSTRACT

An electrical unit and method of assembly that includes a base housing having a plurality of sides and an opening in one of the sides configured to receive a wire therethrough, and a cover configured to mate with the base housing, defining an internal chamber therebetween. A power distribution box is disposed within the internal chamber, at least one electrical connector is disposed at least partially within the internal chamber, operatively engaging the power distribution box, and extending through the opening, and a universal sealing plate that is selectively mountable on each side of the power distribution box and mounted to align with and seal against sides of the opening and at least a portion of the electric connector extending through the opening.

16 Claims, 5 Drawing Sheets

ELECTRICAL UNIT

BACKGROUND OF THE INVENTION

This invention generally relates to an electrical unit, and more particularly to electrical unit, junction and power distribution boxes that may be employed with a vehicle.

Some electrical units, for example, including electrical power distribution boxes, may be employed in different models of vehicles, where each different model of vehicle requires a different shape for the electrical unit due to the different shape of components (e.g., sheet metal) of that particular model of vehicle. The differences in shape may be due to various factors, such as for example, the direction wires extend from the electrical unit.

SUMMARY OF THE INVENTION

According to an aspect, the invention provides an electrical unit includes a base housing having a plurality of sides and an opening in one of the sides configured to receive a wire therethrough, and a cover configured to mate with the base housing, defining an internal chamber therebetween. A power distribution box is disposed within the internal chamber, at least one electrical connector is disposed at least partially within the internal chamber, operatively engaging the power distribution box, and extending through the opening, and a universal sealing plate that is selectively mountable on each side of the power distribution box and mounted to align with and seal against sides of the opening and at least a portion of the electric connector extending through the opening.

According to an aspect, the invention provides a method of assembling an electrical unit, the method including: providing a base housing configured to mount to structure of one model of vehicle of a plurality of vehicles, the base housing having a plurality of sides and an opening in one of the sides corresponding to a wire location for the one model of vehicle; mounting a universal sealing plate to a power distribution box, on a side of the power distribution box adjacent to the opening in the side of the base housing; mounting the universal sealing plate, the power distribution box and at least one electrical connector, operatively engaging the power distribution box, at least partially within an internal chamber defined by the base housing and a cover, with a portion of the at least one electrical connector extending through the opening, and with the universal sealing plate sealing against sides of the opening and the at least one electrical connector extending through the opening; and securing the cover to the base housing, with a portion of the universal sealing plate secured between a portion of the base housing and a portion of the cover According to an aspect, the invention provides an electrical unit that allows for universal portions of the electrical unit to be employed in different models of vehicles, which may have different shaped sheet metal or require directing wires from a different side of the electrical unit.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
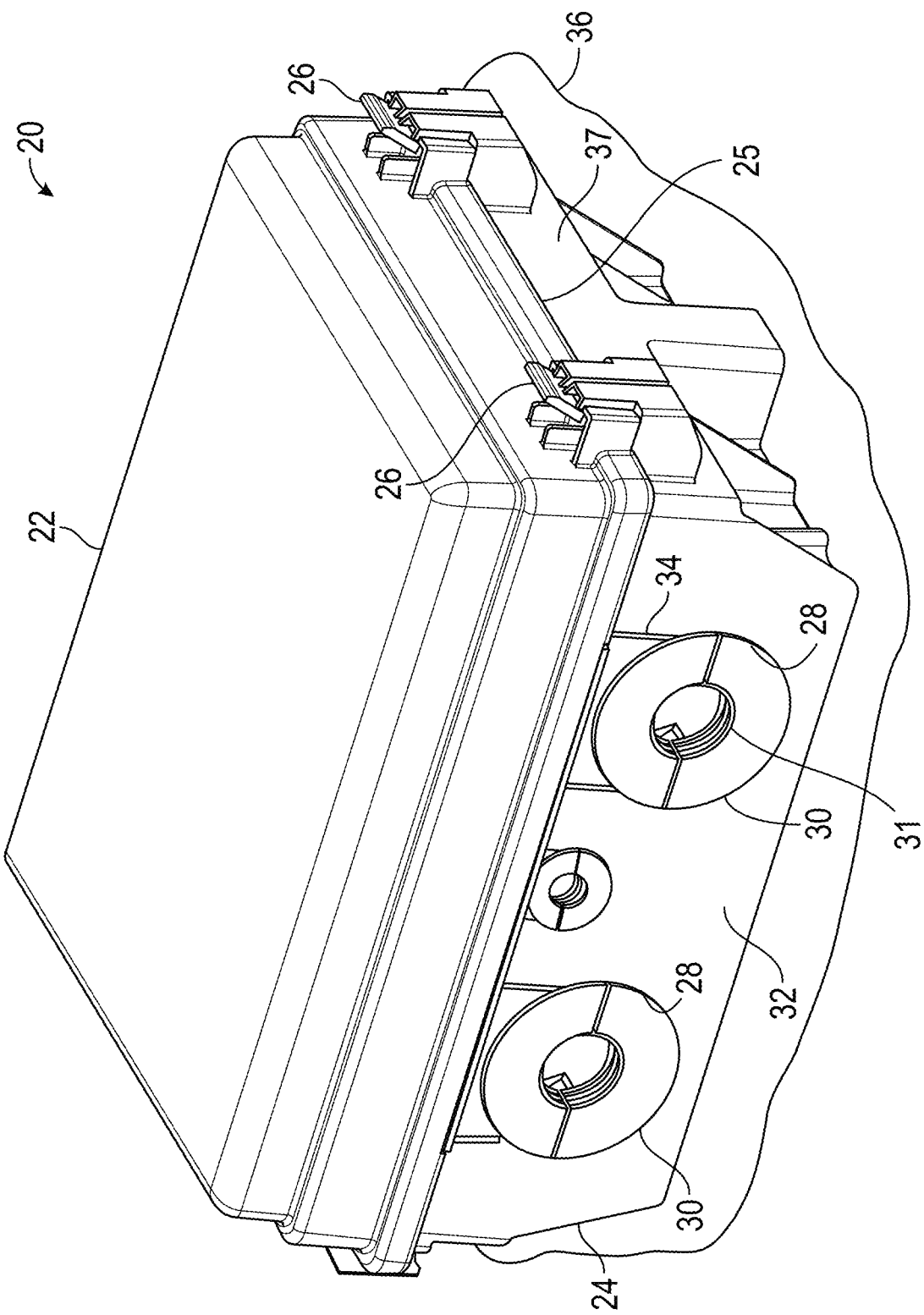
FIG. 1 is a schematic, perspective view generally illustrating an embodiment of an electrical unit.
Figure 2:
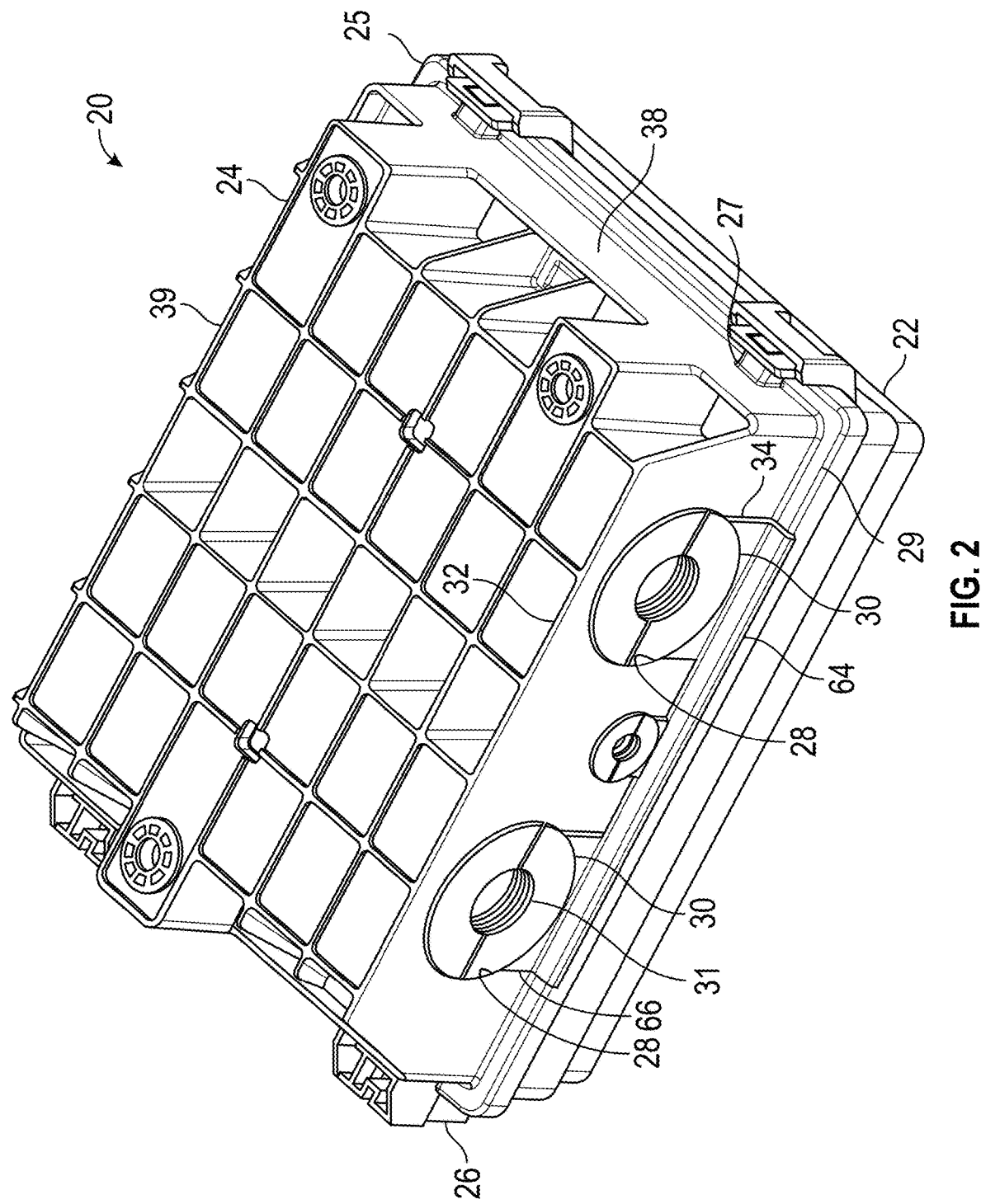
FIG. 2 is a view similar to FIG. 1, but looking at an opposite side of the electrical unit.

Referring now to the drawings, there is illustrated in FIGS. 1 and 2 an embodiment of an electrical unit 20 (e.g., one or more housings that may contain a power distribution box). The electrical unit 20 may include a cover 22, which may be releasably securable to a base housing 24 (e.g., with releasable latches 26 having tabs that can elastically flex to engage with latch tabs 27 on the base housing 24). The cover 22 may be universal. The cover 22 may include a lip 25 around its periphery that operatively engages a cover alignment flange 29 of the base housing 24 to seal against the base housing 24, preventing debris (e.g., water, dust) from entering the electrical unit 20. The cover 22 and base housing 24 may create an internal chamber within which an electronic assembly, such as for example a power distribution box, may be disposed (discussed and shown below). The base housing 24 may include one or more openings 28 that are configured to accommodate wire guides 30 through which wires extend through a wall 32 of the base housing 24. The openings may be, for example, U-shaped (best seen in FIG. 3), and may, for example, extend from adjacent to the cover 22 to around the wire guides 30. The outer surfaces of the portion of the wire guises 30 that extend through the openings 28 may be generally cylindrical. The wire guides 30 may include a central hole 31 through which wires may extend. The base housing 24 may be mounted to structure (e.g., vehicle structure) 36 (shown schematically in FIG. 1). While the openings 28 are shown on a particular wall 32 of the base housing 24 in the embodiment of FIGS. 1 and 2, the openings 28 may instead extend through one of the other walls (e.g., wall 37, wall 38, wall 39), which may be shaped differently in other applications of the electrical unit 20 to accommodate different structure (e.g., different shaped structure in different models of vehicles). A universal sealing plate 34 may mount in the openings 28, sealing between the wire guides 30, the wall 32 and the cover 22 to prevent debris from entering the electrical unit 20.

For particular applications of the electrical unit 20 (e.g., use in different models of vehicles) the base housing 24 may be configured in different shapes to accommodate the different shapes (e.g., of vehicle sheet metal or other vehicle structure/components) and different directions in which wires extend from the electrical unit 20 (e.g., different electrical systems and/or wire harnesses for different models of vehicles). The present embodiment allows for different shapes of the base housing 24 to accommodate different models of vehicles, while allowing for the other components of the electrical unit 20 to be the same (i.e., universal). As used herein, including the claims, the term "universal" means that the particular component/element is the same (or essentially the same) for use in the electrical unit 20 across use of the electrical unit 20 with different structure to which it is mounted and different wiring configurations (e.g., different models of vehicles).

Figure 3:
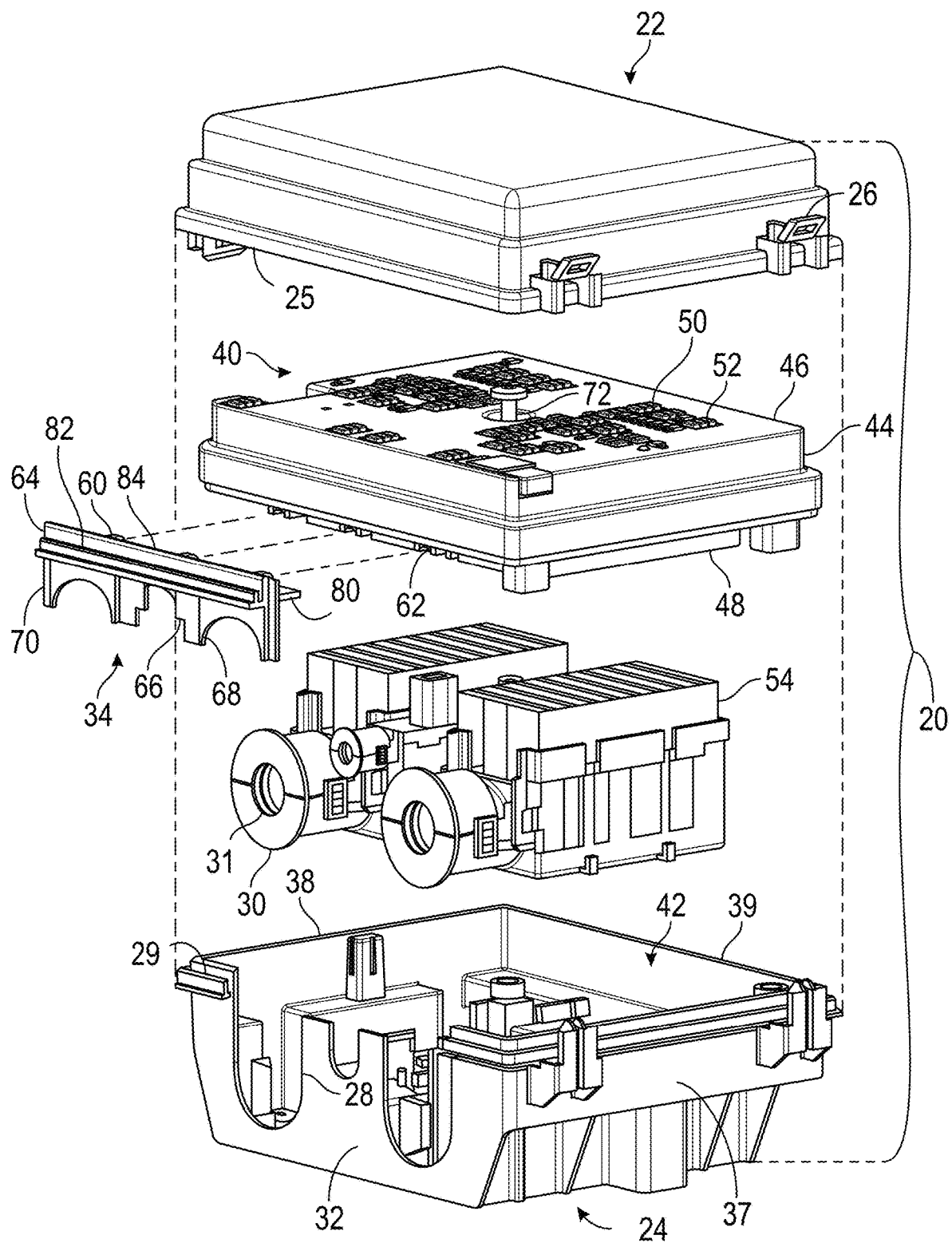
FIG. 3 is a schematic, partially exploded perspective view generally illustrating an embodiment of the electrical unit.
Figure 4:
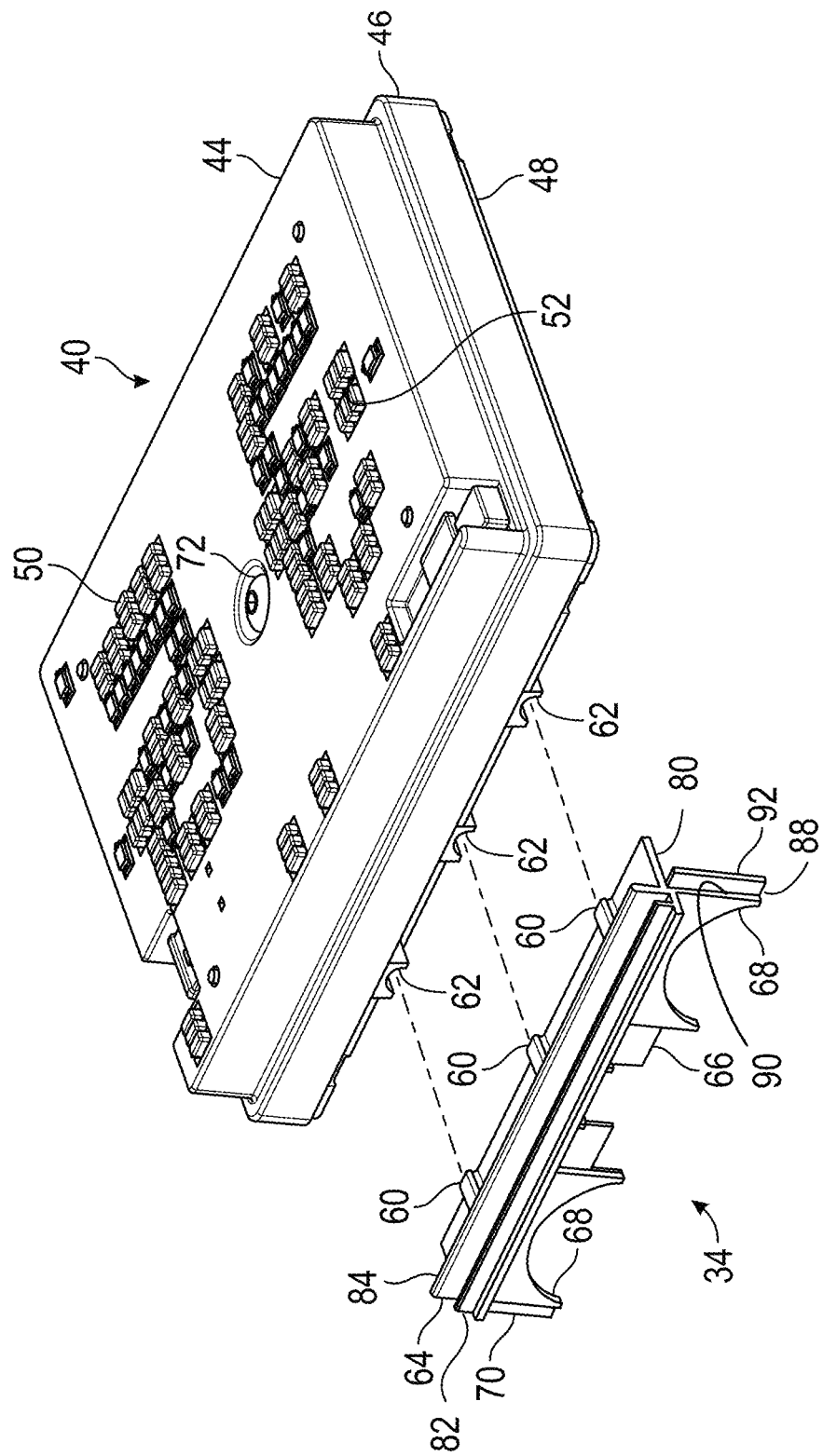
FIG. 4 is a schematic, partially exploded perspective view generally illustrating a portion of the electrical unit.
Figure 5:
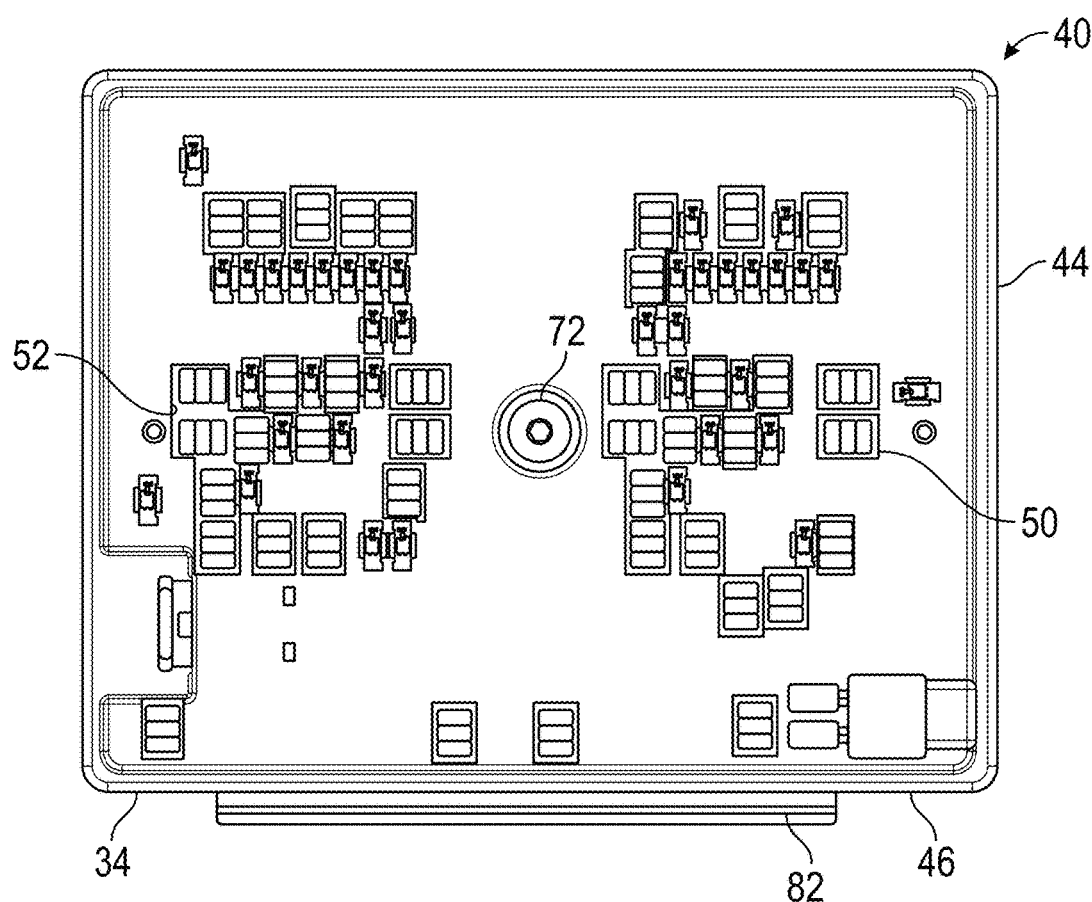
FIG. 5 is a schematic, plan view generally illustrating a portion of the electrical unit.
Figure 6:
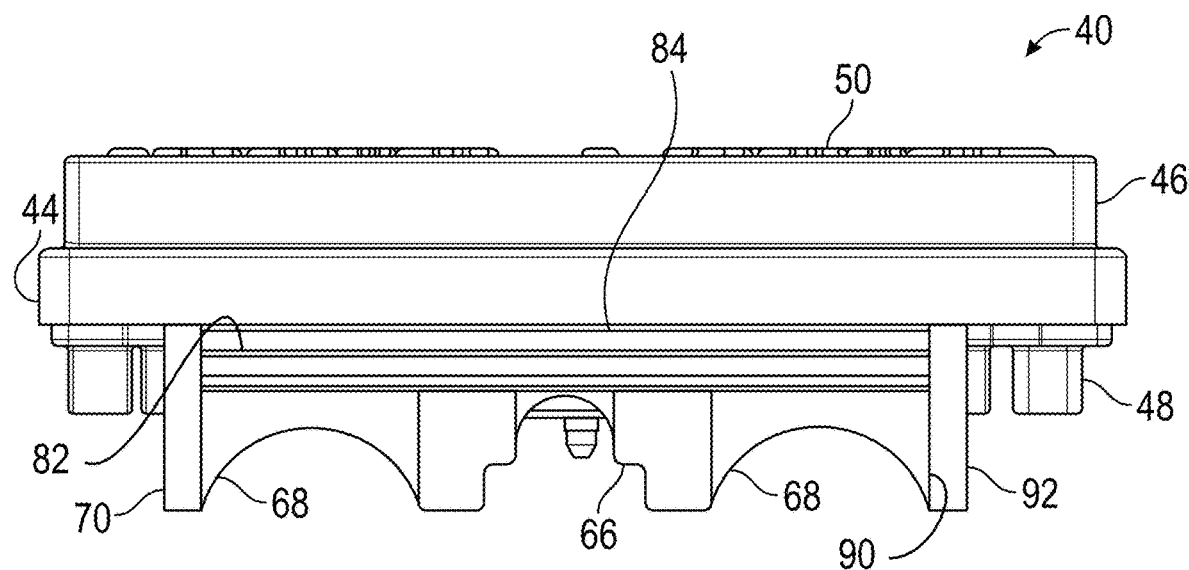
FIG. 6 is a schematic, side view generally illustrating a portion of the electrical unit.

Referring now to FIGS. 3-5, in view of FIGS. 1 and 2, a power distribution box 40 may be disposed in an internal chamber 42, which is formed by the universal cover 22 and base housing 24. The power distribution box 40 may have a universal housing 44, which may comprise a universal housing first portion 46 (adjacent to the cover 22) secured to a universal housing second portion 48 (adjacent to the base housing 24). Electrical components (e.g., fuses) 50 may extend through openings 52 in the first portion 46, with the electrical components 50 forming a portion of a circuit board assembly. Such a circuit board assembly may be, for example, the circuit board assembly disclosed in U.S. Pat. No. 10,283,917 to Darr et al., the entirety of which is incorporated herein by reference. The circuit board assembly may operatively engage an electrical connector assembly 54, which may include the wire guides 30 for supporting, for example, wire harness cables. Additionally, a fastener 72 (or more than one fastener if so desired) may extend through the universal housing 44 and be secured to one or both of the electrical connectors 54 and the base housing 24.

The universal sealing plate 34 may mount to the universal housing 44. The universal sealing plate 34 may include, for example, projections 60 that mount into, for example, slots 62 on the universal housing 44, or may employ other configurations for mounting the universal sealing plate 34 to the universal housing 44. The projections 60 may, for example, extend from a first portion 80 of a first sealing flange 64, which extends parallel to the lip 25. A second portion 82 of the first sealing flange 64 may abut and seal against the lip 25 of the universal cover 22, shaped to fill the gap (due to the openings 28) in the cover alignment flange 29 that extends around the periphery of the base housing 24 except in the location of the openings 28. The second portion 82 may have the same or similar cross sectional shape to the cover alignment flange 29. Thus, in effect, the second portion 82 is the completion of the cover alignment flange 29 extending around the periphery to assure sealing around essentially the entire periphery between the universal cover 22 and the base housing 24. The universal sealing plate 34 may also include a second sealing flange 66 that includes a first portion 84 that abuts the universal housing 44, second portions 68 that seal against the wire guides 30 and third portions 70 that seal against the openings 28 in the base housing 24. The first portion 84 of the second sealing flange 66 may be positioned to abut the universal housing 44 when the second portion 82 of the first sealing flange 64 aligns with the cover alignment flange 29 and the third portions 70 of the second sealing flange align with the portion of the wall 32 surrounding the openings 28. The second portions 68 of the second sealing flange 66 may each have a curved portion that faces and matches the curvature of the outer surface of the respective wire guide 30. Accordingly, when the electrical unit 20 is assembled, the second portions 68 will contact and seal against the outer surfaces of the wire guides 30. The third portions 70 of the second sealing flange 66 may be shaped to define grooves 88 that may extend along generally straight portions of the openings 28, with each groove 88 having a first feature 90 (e.g., an edge of a step in thickness) and a second feature 92. The first features 90 may each align with a respective edge of one of the openings 28. The second features 92 may each be located to abut the inside of the wall 32 (i.e., in the internal chamber 42) adjacent to the respective edge of the one of the openings 28. Accordingly, the third portions 70 of the second sealing flange 66 seal along the generally straight portions of the openings 28.

Assembly of the electrical unit 20 may comprise engaging the universal sealing plate 34 to the universal housing 44 (by for example sliding the projections into the slots 62 until the first portion 84 of the second sealing flange 66 abuts the universal housing 44) and engaging the power distribution box 40 to the electrical connectors 54, with the second portions 68 of the second sealing flange 66 aligned with respective wire guides 30. The electrical connectors 54 and power distribution box 40 may be inserted into the internal chamber 42 of the base housing 24, with the wire guides 30 and second sealing flange 66 inserted into respective openings 28 such that the third portions 70 of the second sealing flange 66 engage sides of the openings 28. The fastener 72 may be engaged to hold the components together. The universal cover 22 may operatively engage the releasable latches 26 to the latch tabs 27 on the base housing 24 to retain the electrical unit 20 as an assembly.

For various applications of the electrical unit 20 (e.g., in different models of vehicles), the shape/configuration of the base housing 24 may be different in order to accommodate mounting to the different shape of structure/components in the various models of vehicles as well as different orientation of wire harnesses (e.g., locating the wire guides 30 extending from different sides of the base housing). Even with the changes to the base housing 24 for different applications of the electrical unit 20, some of the components of the electrical unit 20 may be universal (i.e., be the same or essentially the same for these various applications in different models of vehicles), thus minimizing the number of components that change from one vehicle model to another. For example, the universal sealing plate 34 may engage different sides of the universal housing 44 based on which wall of the base housing 24 includes the openings 28 for the wire guides 30, with sealing provided along the edges of the openings 28 and on the wire guides 30 for each configuration of the base housing 24. In another example, the universal housing 44 (which may include one or both of the universal first and second portions 46, 48) may be employed for the power distribution box 40, with the universal housing 44 remaining the same for various configurations of the base housing 24 used in various models of vehicles. In an additional example, the universal cover 22 may be employed with various configurations of the base housing 24, with the universal cover 22 oriented to align with the particular location of the release latches 26 for that particular configuration of the base housing 24 and sealing against the first sealing flange 64 of the universal sealing plate 34 for each configuration of the base housing 24. In one more example, a single fastener 72 may be the same of all configurations of the base housing 24.

The principle and mode of operation of this invention have been explained and illustrated in its preferred embodiment. However, it must be understood that this invention may be practiced otherwise than as specifically explained and illustrated without departing from its spirit or scope.

What is claimed is:
1. An electrical unit comprising:
a base housing having a plurality of sides and an opening in one of the sides configured to receive a wire therethrough;
a cover configured to mate with the base housing, defining an internal chamber therebetween;
a power distribution box disposed within the internal chamber;

at least one electrical connector disposed at least partially within the internal chamber, operatively engaging the power distribution box, and extending through the opening; and a universal sealing plate selectively mountable on each side of the power distribution box and mounted to align with and seal against sides of the opening and at least a portion of the at least one electric connector extending through the opening.

2. The electrical unit of claim 1 wherein the cover is a universal cover, releasably secured to the base housing.

3. The electrical unit of claim 2 wherein the power distribution box includes a universal housing, with the universal sealing plate secured to the universal housing.

4. The electrical unit of claim 1 wherein the power distribution box includes a universal housing, with the universal sealing plate secured to the universal housing.

5. The electrical unit of claim 4 wherein the opening in the base housing includes two openings and the at least one electrical connector includes two spaced wired guides each extending through a respective one of the two openings, with the universal sealing plate sealed against each of the two wire guides.

6. The electrical unit of claim 4 wherein the universal sealing guide seals between a portion of the base housing and a portion of the cover, on a side of the plurality of sides of the base housing that includes the opening.

7. The electrical unit of claim 6 wherein the universal sealing flange includes a first sealing flange extending from a second sealing flange, with the first sealing flange secured between the base housing and the cover and the second sealing flange secured in the opening.

8. The electrical unit of claim 4 wherein the universal housing includes a first universal portion secured to a second universal portion, and with electrical components disposed between the first and second universal portions of the universal housing.

9. The electrical unit of claim 4 wherein a single fastener secures the power distribution box against the at least one electrical connector within the interior chamber.

10. The electrical unit of claim 1 wherein the cover is a universal cover and the universal sealing guide seals between a portion of the base housing and a portion of the universal cover, on a side of the plurality of sides of the base housing that includes the opening.

11. The electrical unit of claim 10 wherein the universal sealing flange includes a first sealing flange extending from a second sealing flange, with the first sealing flange secured between the base housing and the universal cover and the second sealing flange secured in the opening.

12. A method of assembling an electrical unit, the method comprising:

providing a base housing configured to mount to structure of one model of vehicle of a plurality of vehicles, the base housing having a plurality of sides and an opening in one of the sides corresponding to a wire location for the one model of vehicle;

mounting a universal sealing plate to a power distribution box, on a side of the power distribution box adjacent to the opening in the side of the base housing;

mounting the universal sealing plate, the power distribution box and at least one electrical connector, operatively engaging the power distribution box, at least partially within an internal chamber defined by the base housing and a cover, with a portion of the at least one electrical connector extending through the opening, and with the universal sealing plate sealing against sides of the opening and the at least one electrical connector extending through the opening; and securing the cover to the base housing, with a portion of the universal sealing plate secured between a portion of the base housing and a portion of the cover.

13. The method of claim 12 wherein the cover is a universal cover, and the method further includes securing the universal cover to releasable latches on the base housing, with the releasable latches being located on one of the plurality of sides of the base housing based on the one model of vehicle.

14. The method of claim 12 wherein the power distribution box includes a universal housing, with the universal sealing plate secured to the universal housing.

15. The method of claim 14 wherein the universal housing includes a first universal portion and a second universal portion and wherein the method further comprises locating electrical components between the first universal portion and the second universal portion, and securing the first and second universal portions together.

16. The method of claim 12 further comprising installing a single fastener to secure the power distribution box against the at least one electrical connector within the interior chamber.

* * * * *